US007000841B2

(12) United States Patent
Becker

(10) Patent No.: US 7,000,841 B2
(45) Date of Patent: Feb. 21, 2006

(54) LIGHTING APPARATUS FOR MOUNTING ON HAT BRIM

(75) Inventor: Kenneth Becker, Alanson, MI (US)

(73) Assignee: Angel Lighting LLC, Bloomfield Hills, MI (US)

( * ) Notice: Subject to any disclaimer, the term of this patent is extended or adjusted under 35 U.S.C. 154(b) by 69 days.

(21) Appl. No.: 10/440,954

(22) Filed: May 16, 2003

(65) Prior Publication Data

US 2004/0228119 A1 Nov. 18, 2004

(51) Int. Cl.
*G06K 7/10* (2006.01)

(52) U.S. Cl. .............................. 235/462.42; 2/209.13; 2/10; 362/105

(58) Field of Classification Search ........... 235/462.42, 235/462.41; 362/105–106, 191, 184; 2/209.12, 2/175.1, 171, 195.1–195.3, 209.13, 10, 12, 2/906

See application file for complete search history.

(56) References Cited

U.S. PATENT DOCUMENTS

| | | | | |
|---|---|---|---|---|
| 994,094 A | | 5/1911 | Eaton | |
| 3,350,552 A | | 10/1967 | Lawrence | 240/2 |
| 3,634,676 A | | 1/1972 | Castellano | 240/6.4 W |
| 4,195,328 A | | 3/1980 | Harris, Jr. | 362/72 |
| 4,234,910 A | | 11/1980 | Price | 362/105 |
| 4,521,831 A | | 6/1985 | Thayer | 362/32 |
| 4,616,297 A | | 10/1986 | Liu | 362/105 |
| 4,793,007 A | | 12/1988 | Barnett | 2/422 |
| 4,891,736 A | | 1/1990 | Gouda | 362/105 |
| 4,958,264 A | | 9/1990 | Evendon | 362/106 |
| 4,999,747 A | | 3/1991 | Chen | 362/103 |
| 5,207,500 A | | 5/1993 | Rios et al. | 362/105 |
| 5,224,772 A | | 7/1993 | Fustos | 362/105 |
| 5,408,393 A | | 4/1995 | Becker | 362/105 |
| 5,510,961 A | * | 4/1996 | Peng | 362/106 |
| 5,553,325 A | * | 9/1996 | Gutierrez | 2/171 |
| 5,564,128 A | | 10/1996 | Richardson | 2/422 |
| 5,596,491 A | | 1/1997 | Gold | 363/65 |
| 5,608,919 A | | 3/1997 | Case | 2/422 |
| 5,658,065 A | | 8/1997 | Jamieson | 362/106 |
| 5,664,868 A | | 9/1997 | Montalbano et al. | 362/105 |
| 5,688,039 A | | 11/1997 | Johnson | 362/106 |
| 5,689,830 A | * | 11/1997 | Pflum | 2/195.1 |
| 5,732,486 A | * | 3/1998 | Rapisarda | 36/137 |
| 5,741,060 A | * | 4/1998 | Johnson | 362/106 |
| 5,743,621 A | | 4/1998 | Mantha et al. | 362/105 |
| 5,911,494 A | * | 6/1999 | Lary | 362/106 |

(Continued)

FOREIGN PATENT DOCUMENTS

FR 717.321 10/1931

OTHER PUBLICATIONS

*Hazardous Training*, R. Scott, Arizona Daily Sun (Item 1) Photograph.

(Continued)

*Primary Examiner*—Thien M. Le
*Assistant Examiner*—Edwyn Labaze
(74) *Attorney, Agent, or Firm*—Butzel Long

(57) ABSTRACT

A flexible light assembly is provided. The flexible light assembly is mountable with respect to the underside of the brim of the hat. The light assembly can be made of a flexible resilient material and be conformed to correspond to any configuration of brim. The light assembly 10 includes at least one light emitter, means for powering the light emitter, and means for controlling the emission of light. The light assembly can be completely positional under the brim of a hat. The light assembly can be removably associated with respect to a hat.

20 Claims, 2 Drawing Sheets

U.S. PATENT DOCUMENTS

| | | | | |
|---|---|---|---|---|
| 6,009,555 | A * | 1/2000 | Siprut | 2/12 |
| 6,032,291 | A * | 3/2000 | Asenguah et al. | 2/171.3 |
| 6,044,495 | A * | 4/2000 | Ellman et al. | 2/195.1 |
| 6,056,413 | A * | 5/2000 | Urso | 362/106 |
| 6,113,243 | A | 9/2000 | Saul | 362/105 |
| 6,244,721 | B1 | 6/2001 | Rodriguez et al. | 362/106 |
| 6,283,620 | B1 | 9/2001 | Taylor et al. | 362/474 |
| 6,439,733 | B1 | 8/2002 | Fischer et al. | 362/106 |
| 6,659,618 | B1 * | 12/2003 | Waters | 362/106 |
| 6,721,962 | B1 * | 4/2004 | Polaire | 2/209.13 |
| D489,165 | S * | 5/2004 | Waters | D2/866 |
| 6,733,150 | B1 * | 5/2004 | Hanley | 362/106 |
| 6,935,761 | B1 * | 8/2005 | Vanderschuit | 362/106 |
| 2003/0151910 | A1 * | 8/2003 | Marston | 362/106 |
| 2004/0128737 | A1 * | 7/2004 | Gesten | 2/171 |

OTHER PUBLICATIONS

*Helmet Mount for Your Mini-Light*, Gall's Express (Item 2) Photograph *Smokeout #FL033-D Mini light Helmet Mount for AA Smokecutter Jr. Mini-Lite* $4.99, Gall's Express (Item 2).

*TopSpot by Streamlight*, Gall's, Inc. (Item 3) Photograph.

* cited by examiner

LIGHTING APPARATUS FOR MOUNTING ON HAT BRIM

FIELD OF THE INVENTION

The invention relates to an apparatus operable to emit light, and, more specifically, the invention provides a flexible light assembly engageable with the brim of a hat.

BACKGROUND OF THE INVENTION

It can be desirable to position a light with respect to an operator's head to provide light along the operator's line of sight and adjacent the line of sight, as well as to free the operator's hands for the performance of various tasks. For example, light assemblies can be mounted with respect to motorcycle helmets, construction helmets, mining helmets, firefighter helmets and athletic helmets. Light assemblies are configured to engage a particular style of hat.

SUMMARY OF THE INVENTION

The present invention provides an apparatus operable to emit light and engageable with a hat brim or visor. As used herein, the term "hat" refers to any style headpiece including a brim or visor. The apparatus includes a flexible member. The flexible member defines a longitudinal axis and can bend about or along the longitudinal axis to conform to at least one surface defined by the hat. The flexible member can selectively conform to the surface such that the flexible member can be engaged with a plurality of differently configured surfaces. The flexible member can be resilient and formed from foam rubber.

The flexible member can engage a surface associated with the brim of the hat. For example, the surface can be an underside of the brim of the hat. The flexible member can be sized and/or shaped to be completely disposed under the brim of the hat. The thickness of the flexible member can be less than a distance defined between the underside of the brim of the hat and a sight line of a wearer of the hat. In other words, the flexible member can be sized to ensure that the flexible member does not obscure the operator's line of sight. An outer surface of the flexible member can be aligned with an edge of the brim of the hat. An inner surface of the flexible member can be aligned with a head of a wearer of the hat.

The invention can also include means for operably associating the flexible member with the hat. For example, the flexible member can be engaged to the hat with velcro, adhesive, or clips. The flexible member can be permanently engaged with the surface of the hat, or removable with respect to the hat.

The flexible member can support at least one light emitter or a plurality of light emitters. The flexible member can be bendable about a longitudinal axis of the at least one light emitter. The invention can include a plurality of light emitters and the flexible member can be bendable about the longitudinal axis of each of the plurality of light emitters. The light emitters can be pointed in the same direction, or can be pointing in different directions.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Various embodiments of the invention are shown throughout the figures. The figures include common elements in different operating environments. Common elements are designated with a common base numeral and differentiated with an alphabetic designation.

Figure 1:
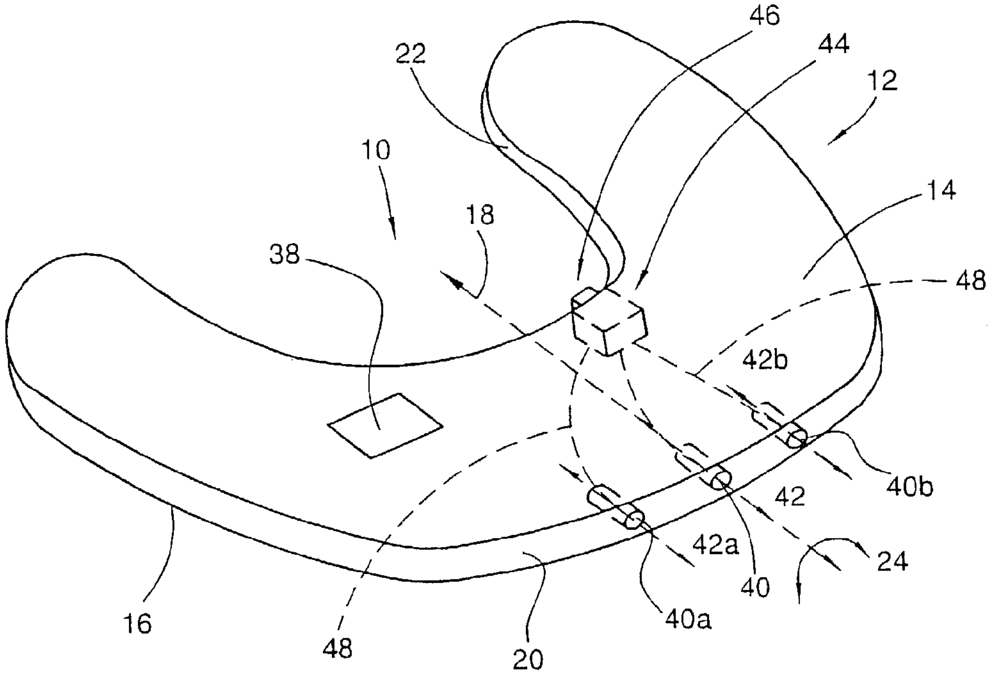
FIG. 1 is a perspective view of a light assembly according to an embodiment of the invention.

Referring now to FIG. 1, the invention provides a light assembly 10 operable to emit light and engageable with a hat including a flexible member 12 defining a longitudinal axis 18 and operable to selectively conform to at least one surface defined by the hat. The flexible member 12 can selectively conform to a plurality of different surfaces of a hat. The flexible member 12 can include a top surface 14 and a bottom surface 16. The flexible member 12 can be engageable with respect to a hat adjacent either the top surface 14 or the bottom surface 16. The flexible member 12 can also include a first or outwardly facing surface 20 and a second or inwardly-facing surface 22. The surfaces 14, 16, 20 and 22 can cooperate to define a substantially U-shaped member 12. The flexible member 12 can be shaped to correspond to the shape of at least one surface of a hat. For example, the flexible member 12 can be shaped by a user to correspond to the brim of a hat.

The flexible member 12 can be fabricated from a flexible material. The flexible member 12 can be formed from a resilient material. For example, the flexible member 12 can be conformed to the surface of a first hat, disengaged with respect to the first hat, and conformed to a second hat. The flexible member 12 can be bendable about the longitudinal axis 18, such as along an angular path 24. The flexible member can be bendable along the longitudinal axis 18, such that the longitudinal axis 18 can be arched.

Figure 2:
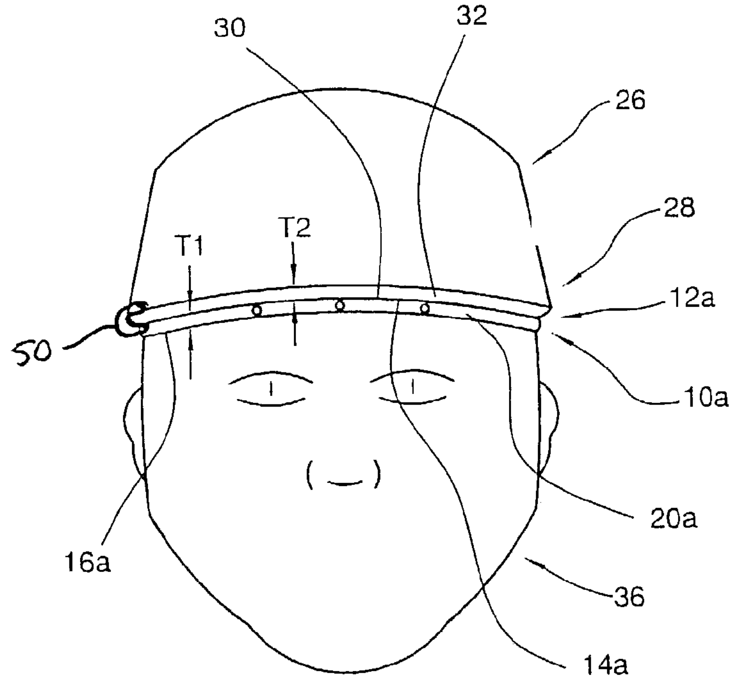
FIG. 2 is a front plan view of a light assembly according to the invention engaged with respect to a hat.
Figure 3:
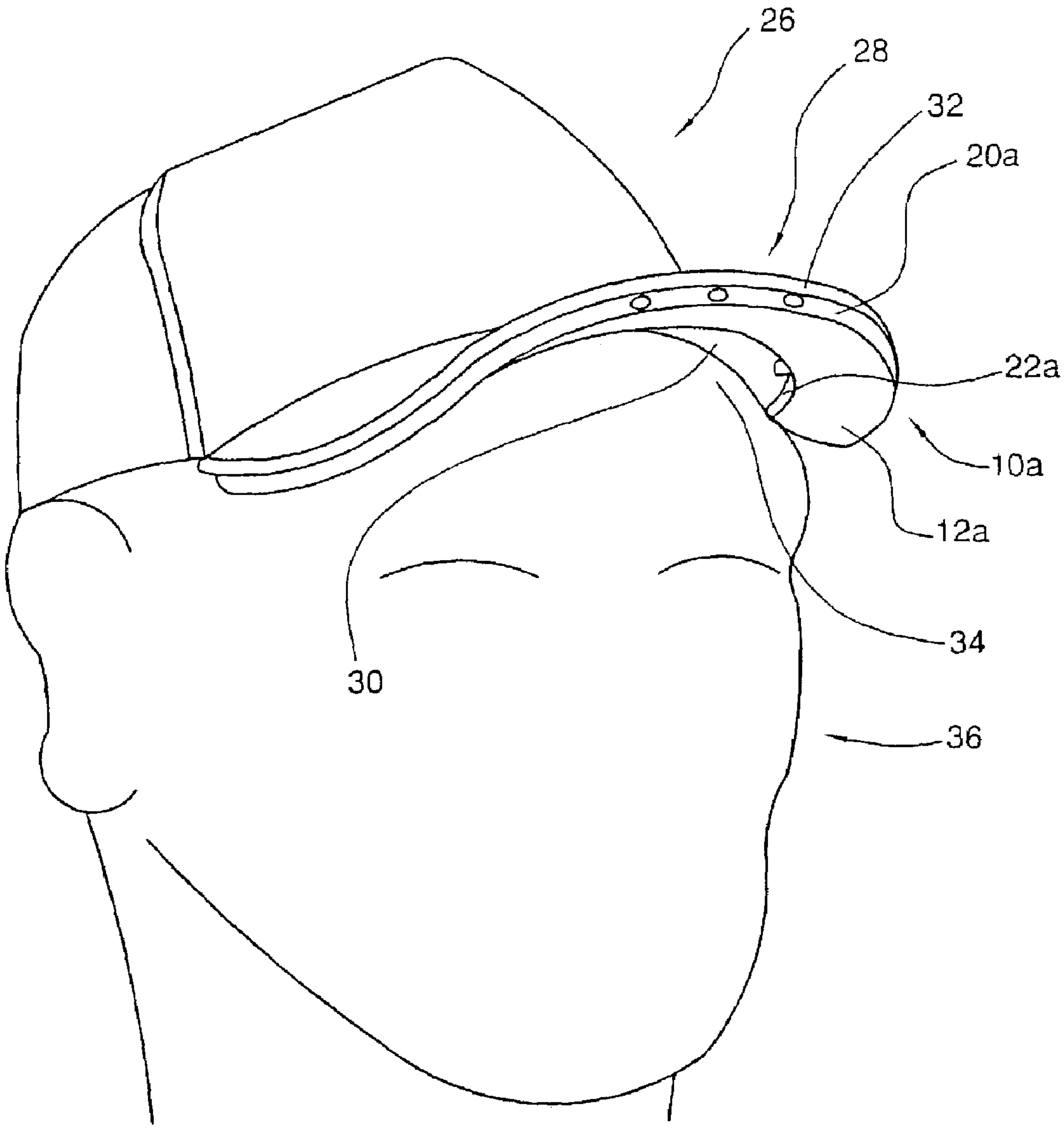
FIG. 3 is a perspective view of a light assembly according to the invention engaged with respect to a hat.

Referring now to FIGS. 2 and 3, the light assembly **10*a* can be engaged with a hat 26. The flexible member 12*a* can be operable to conform to at least one surface 30 of the hat 26. The at least one surface can be defined by a brim 28 of the hat 26. The at least one surface can be an underside surface 30 of the brim 28. The flexible member 12*a* can be completely disposed under the brim 28 of the hat 26. For example, the first surface 20*a* can be recessed with respect to a front edge 32 of the brim 28. Alternatively, the first surface 20*a* can be substantially aligned with the edge 32 of the brim 28 when the flexible member 12*a* is conformed with respect to the surface 30 of the hat 26. Alternatively, the first surface 20*a* can project outwardly with respect to the edge 32. The second surface 22*a* can be substantially aligned with a head 34 of a wearer 36 of the hat 26 when the flexible member 12 is conformed with respect to the hat 26 and the hat 26 is worn by the wearer 36. Alternatively, the surface 22*a* can be spaced from the head 34 of the wearer 36, best shown in FIG. 3. The surface 22*a*** can be spaced to accommodate positioning of controls for a power source for a light emitter.

The surface 22*a* can define an arcuate profile extending generally parallel to the head 34 of the wearer 36. The first surface 20*a* and the second surface 22*a* can be, at least partially, substantially parallel to one another. The first surface 20*a* can be spaced with respect to the second surface 22*a* a predetermined distance substantially equal to a width of the brim 28 of the hat 26.

The flexible member 12 can be sized such that the thickness T1 of the flexible member 12 is substantially similar to the thickness T2 of the brim 28. The thickness T1 of the flexible member can be determined to ensure that a sight line of the wearer 36 is not obstructed by the flexible member 12*a*. Thus, the flexible member 12*a* can be positioned between the underside surface 30 of the brim 28 and the sight line of the wearer 36.

Referring now to FIGS. 1–3 the flexible member 12 can include means 38 for operably associating the flexible member 12 with respect to a hat. Means 32 can be velcro or adhesive. Means can also include at least one clip 50. FIG. 2 shows a single clip 50, however, more than one clip 50 can be positionable along the brim 28 to removably secure the flexible member 12 with respect to the brim 28. Means 38 can be disposed at one position along either surface 14 or 16, or can be disposed at a plurality of positions along either surface 14 or 16. The flexible member 12 can be removably engageable with respect to a hat. For example, the flexible member 12 can be engaged with a first hat, removed with respect to the first hat, and engaged with a second, differently configured hat. The hat can be any configuration of hat, especially hats defining a brim.

Referring now to FIG. 1, the light assembly 10 can also include at least one light emitter 40. The light emitter 40 can be a light-emitting diode. The light emitter 40 can be operably supported by the flexible member 12. The light emitter 40 can define a longitudinal axis and the flexible member 12 can be bendable about the longitudinal axis 42 of the light emitter 40. The light assembly 10 can include a plurality of light emitters 40, 40*a* and 40*b*. Each of the light emitters 40, 40*a*, and 40*b* can define respective longitudinal axis 42, 42*a* and 42*b*. One of more of the axis 42, 42*a* and 42*b* can be parallel with respect to the axis 18. The flexible member 12 can be selectively bendable about one or more of the axis 42, 42*a* and 42*b* of the plurality of light emitters 40, 40*a* and 40*b*. One or more of the axis 42, 42*a* and 42*b* can be angled with respect to one another.

Flexible member 12 can be removably engageable with respect to a hat to selectively position the at least one light emitter 40 relative to the brim of the hat. In other words, the flexible member 12 can be positioned to direct light in any desired direction relative to the hat. Also, the flexible member 12 can be recessed with respect to an edge 32 of the brim 28 to limit light emitted in an upward direction. Alternatively, the member 12 can be positioned with respect to the hat 26 to extend past the brim 28 to maximize the light emitted in an upward direction. The at least one light emitter can be disposed in an aperture defined by the flexible member 12.

Referring now to FIG. 1, the light assembly can also include means 44 for powering the one or more light emitters 40, 40*a* and 40*b*. Means 44 can include a battery in electric communication with the one or more light emitters 40, 40*a* and 40*b*. Means such as wires 48 for communicating electrical power between the light emitters 40, 40*a* and 40*b* and the means 44 can be disposed internal with respect to the flexible member 12. The light assembly 10 can also include means 46 for controlling powering means 44 to selectively power to the one or more light emitters. Means 46 can be a push button switch. Means 46 can include a flexible circuit board. Means 44 can be at least partially disposed internal with respect to the flexible member 12. Means 44 and means 46 can be positional with the flexible member 12 adjacent the underside 30 of the brim 28. Means 46 can include a switch to selectively engage and disengage electrical communication between means 44 and the one or more light emitters 40, 40*a* and 40*b*. Means 46 can be positional between the first surface 20 and the hat 34 of the wearer 36.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A lighting apparatus for mounting on a brim of a hat comprising:

a flexible member having a generally planar top surface, a generally planar bottom surface extending parallel to and spaced from said top surface by a predetermined thickness of said member, an outwardly facing surface extending transverse to said top and bottom surfaces, an inwardly facing surface extending transverse to said top and bottom surfaces, and a longitudinal axis extending through said flexible member from said outwardly facing surface to said inwardly facing surface, said flexible member being formed of a resilient material and being bendable about and along said longitudinal axis;

at least one light emitter mounted in said flexible member and being exposed at said outwardly facing surface; and means for releasably attaching said flexible member to the hat with one of said top and bottom surfaces abutting a mounting surface of the brim whereby when said flexible member is attached to the brim and the mounting surface is contoured, said flexible member bends to conform to the contoured mounting surface and said light emitter is positioned to provide hands-free illumination along and adjacent to a line of sight of a wearer of the hat.

2. The apparatus according to claim 1 wherein said flexible member is formed from a foam material.

3. The apparatus according to claim 1 wherein said flexible member is generally U-shaped in plan view and is sized to attach said top surface to an underside of the brim forming the mounting surface.

4. The apparatus according to claim 3 wherein said top surface covers substantially the entire underside of the brim.

5. The apparatus according to claim 1 wherein said predetermined thickness is less than a distance between an underside of the brim and the line of sight of the wearer.

6. A lighting apparatus for mounting on a brim of a hat comprising:

a flexible member having a generally planar top surface and an outwardly facing surface extending transverse to said top surface, said flexible member being formed of a resilient material and being bendable along and about a longitudinal axis extending from said outwardly facing surface through said flexible member;

at least one light emitter mounted in said flexible member and exposed at said outwardly facing surface; and means for releasably attaching said flexible member to an underside surface of the brim of the hat whereby when said flexible member is attached to the underside surface and the underside surface is contoured, said flexible member bends to conform said top surface to the contoured underside surface and said light emitter is positioned to provide hands-free illumination along and adjacent to a line of sight of a wearer of the hat.

7. The apparatus according to claim 6 wherein said flexible member is formed of a resilient material.

8. The apparatus according to claim 7 wherein said flexible member is formed a foam rubber material.

9. The apparatus according to claim 6 wherein said flexible member is sized to be completely disposed under the brim of the hat.

10. The apparatus according to claim 6 wherein said flexible member has a thickness between said top surface and a generally parallel planar bottom surface less than a distance between the underside surface of the brim and the line of sight of the wearer.

11. The apparatus according to claim 6 wherein said means for releasably attaching is at least one of a hook and loop material, a clip and an adhesive.

12. The apparatus according to claim 6 wherein said flexible member has an inwardly facing surface extending transverse to said top surface and being configured to align with a head of the wearer.

13. The apparatus according to claim 6 including a power source mounted in said flexible member and a switch connected between said- power source and said at least one light emitter for selectively applying electrical power from said power source to said at least one light emitter.

14. A lighting apparatus for mounting an a brim of a hat comprising:

a flexible member having a generally planar top surface, a generally planar bottom surface extending parallel to and spaced from said top surface, an outwardly facing surface extending transverse to said top and bottom surfaces, said flexible member being bendable to conform at least one of said top and bottom surfaces to an external mounting surface on the brim of the hat;

a plurality of light emitters mounted in said flexible member and exposed at said outwardly facing surface; and means for releasably attaching said flexible member at one of said top and bottom surfaces to the mounting surface whereby when said one of said top and bottom surfaces is attached abutting the mounting surface and the mounting surface is contoured, said flexible member bends to conform said one of said top and bottom surfaces to the contoured mounting surface and each of said light emitters is positioned to provide hands-free illumination along and adjacent to a line of sight of a wearer of the hat.

15. The apparatus according to claim 14 wherein each of said light emitters is mounted on an associated longitudinal axis along which each said light emitter emits light from said outwardly facing surface.

16. The apparatus according to claim 15 wherein said flexible member is selectively bendable about and along each said associated longitudinal axis.

17. The apparatus according to claim 15 wherein at least one of said associated longitudinal axes is angled with respect to another one of said associated longitudinal axes.

18. The apparatus according to claim 14 wherein said means for releasably attaching is at least one of a hook and loop material, a clip and an adhesive.

19. The apparatus according to claim 14 including a power source mounted in said flexible member and a switch connected between said power source and said at least one light emitter for selectively applying electrical power from said power source to each said light emitter.

20. The apparatus according to claim 19 wherein said switch is positioned at an inwardly facing surface of said flexible member.

* * * * *

UNITED STATES PATENT AND TRADEMARK OFFICE

CERTIFICATE OF CORRECTION

PATENT NO. : 7,000,841 B2 Page 1 of 1
APPLICATION NO. : 10/440954
DATED : February 21, 2006
INVENTOR(S) : Kenneth Becker It is certified that error appears in the above-identified patent and that said Letters Patent is hereby corrected as shown below:

Col. 5, Line 12 Claim 8, line 2, please insert --of-- after “formed”; and
Col. 5, Line 30 Claim 13, line 3, please delete “-” after “said”.

Signed and Sealed this

Thirteenth Day of February, 2007

JON W. DUDAS
*Director of the United States Patent and Trademark Office*